2,950,303
Patented Aug. 23, 1960

2,950,303

PREPARATION OF ORGANOMERCURY COMPOUNDS

James M. Riddle, Baton Rouge, La., assignor to Ethyl Corporation, New York, N.Y., a corporation of Delaware No Drawing. Filed May 1, 1959, Ser. No. 810,236

4 Claims. (Cl. 260—431)

The present invention is concerned with a process for the production of organomercury compounds, particularly dialkylmercury compounds.

There are numerous methods reported in the literature for the preparation of organomercury compounds. Without attempting to mention all such processes, the following are typical: mercury has been reacted with alkyl halides to form alkyl mercury halides; sodium amalgam has been reacted with alkyl halides to form dialkylmercury compounds; and certain mercury halides have been reacted with certain organometallic compounds, e.g. the Grignard reagent, to form the dialkyl mercury compounds. All of the presently known procedures are primarily of academic interest and suffer particular disadvantages. So far as now known, a simple and convenient method for the preparation of dialkylmercury compounds, readily adaptable to commercial operation, has not been available.

The alkyl mercury compounds are of considerable utility. For example, they are useful as intermediates for forming other organometallic compounds, a typical reaction being that of diethylmercury with sodium metal to form ethylsodium. Another use for the mercury compounds, and derivatives thereof, is in agricultural chemical applications. Still other uses are known and a more practical method for their preparation is desirable to further amplify the utility of these compounds.

Accordingly, an object of this invention is to provide a new and novel process for the production of organomercury compounds. A further object is to provide a process whereby greater and more economical yields of organomercury compounds are obtained. A particular object is to provide a new and novel process for the manufacture of dialkylmercury compounds. These and other objects will be apparent as the discussion proceeds.

The above and other objects of this invention are accomplished by reacting a trialkyl- or trialkenylborane with an oxide of mercury in an aqueous medium. Mercuric oxide is the preferred oxide of mercury and the lower trialkylboranes are the preferred organoborane compounds, especially triethylborane. Particular advantage is achieved when the reaction is conducted at a temperature between 20 to 100° C. and enough water is present to provide a fluid reaction mixture. Still further advantage in improving the basic reaction is obtained when an alkali metal hydroxide, particularly sodium hydroxide, is incorporated in the reaction mixture in at least minor amount. Thus, a particularly preferred embodiment of this invention comprises the reaction of mercuric oxide with a lower trialkylborane at a temperature between about 20 to 100° C. in the presence of sufficient water to provide a fluid reaction system. A still more preferred embodiment comprises conducting the latter reaction in the further presence of at least a minor amount of sodium hydroxide.

The present invention is of particular advantage in that high yields, essentially quantitative, are obtained at less stringent and under less hazardous conditions than the prior art processes and dry materials are not required. A further advantage is that a very simple recovery system is accomplished with the product usually being readily withdrawn from the reaction system as formed permitting ready adaptability of the process to continuous operation. A still further advantage of the process is that the oxide ore itself, which is readily available and economical, can be employed. Still other advantages will be apparent.

While any form of an oxide of mercury is applicable in the process of this invention, mercuric and mercurous oxide or the ore itself (montroydite) are generally employed. Mercuric oxide is preferably used along with montroydite because of their greater availability and easier handling. When such materials are not soluble in the reaction system, they can be employed in massive form. Generally, however, it is convenient to use these materials as finely-divided particles below about ¼" in major dimension with particles below ¹⁄₁₆" in major dimension being preferred for easier handling and faster reaction rates.

The organoborane compounds employed in the process are the trialkyl- or trialkenylboranes. In general, such compounds will contain up to and including about 18 carbon atoms in each hydrocarbon portion. Illustrative examples of the alkyl- and alkenylboranes are trimethylborane, triethylborane, tripropylborane, trihexylborane, trioctylborane, tridecylborane, tridodecycloborane, trioctadecylborane, trivinylborane, tri-1-propenylborane, tri-2-butenylborane, tri-1-hexenylborane, tri-1-octenylborane, tri-1-octadecenylborane, tri-2,4-octadecadienylborane and the like. It is to be understood that the hydrocarbon portions of such compounds can be branched chain and further substituted with functional groups which are essentially inert in the reaction, such as the halogens, carbonyl and the like. The trialkyl- and trialkenylboranes of the lower alkyl and alkenyl radicals, that is, having up to and including about 8 carbon atoms in each of such groups, are preferred because of their greater availability and reactivity in the process. The trialkylboranes having up to and including about 8 carbon atoms in each alkyl group are more especially preferred, particularly triethylborane, because of their easier handling and greater availability.

The proportions of the reactants can be varied over a considerable range to result in the desired organomercury compound. It is preferable, however, to employ at least the stoichiometric amount of the alkyl- or alkenylborane compound. Advantage is achieved in higher yields and faster reaction rates when a molar excess between about 5 to 15 percent of the alkyl- or alkenylborane is employed. In determining the stoichiometry, one can base it upon the consumption of one or all of the alkyl or alkenyl groups in the trialkyl- and trialkenylboranes. Since faster reaction is obtained of the first alkyl or alkenyl group of the organoborane compound, a particular embodiment of the invention comprises employing the above stoichiometric portions based upon reaction of only one alkyl group per molecule of the alkyl- or alkenylborane. The water employed in the system is usually provided in amount to result in a fluid reaction mixture. It is also desirable to employ at least 3 moles of water per mole of the trialkyl- or trialkenylborane. In a preferred embodiment, between about 5 to 200 moles of water per mole of the alkyl- or alkenylborane is employed.

The process is subject to relatively simple manipulative operations. In general, the requisite amounts of organoborane compound and water are added to a reactor and then the mercury oxide is added thereto. The reverse mode of addition is equally applicable although higher yields are obtained when adding the oxide to the organoborane. The mixture is then agitated to facilitate contact of the reactants. During the addition and reaction, an inert atmosphere, such as argon, nitrogen, or krypton, is preferably employed because of the flammability of the organoborane compound. The mixture is reacted at the desired temperature and then, or during the course of the reaction, the product can be withdrawn in essentially pure form from the bottom of the reactor, in those instances wherein the product is of appropriate specific gravity, or, alternatively, the product is readily distillable from the reaction mixture in pure form. It is to be understood that other variations in the process can be made without departing from the purposes of the present invention.

The process will be more completely understood from a consideration of the following examples wherein all parts are by weight unless otherwise specified.

*Example I*

To a reactor equipped with internal agitation, external heating means, a reflux condenser, and a means for maintaining an inert atmosphere, is added 105 parts of triethylborane and 1000 parts of water under a nitrogen atmosphere. Agitation is commenced and the mixture is heated to 50° C. Then 325 parts of mercuric oxide of particle size below 1/16" in diameter is added thereto over a period of 15 minutes. Two colorless layers immediately form. The diethylmercury is withdrawn from the bottom of the reaction mixture in high yield.

*Example II*

Employing the reactor of Example I, 10.8 parts of mercuric oxide, 100 parts of water, and 6 parts of sodium hydroxide were added to the reactor and then 4.9 parts of triethylborane was added over a period of 15 minutes. During the addition, the bright yellow color of the mercuric oxide began to fade and at the completion of the addition and cessation of agitation, two colorless layers resulted. The lower layer was withdrawn. The withdrawn liquid diethylmercury amounted to 13.2 parts representing a yield of 98 percent.

*Example III*

When Example II is repeated substituting trioctylborane for triethylborane with the reaction temperature at 80° C. and adding the mercuric oxide to a solution of the borane and sodium hydroxide in the water, dioctylmercury is readily withdrawn from the bottom of the reactor in essentially quantitative yield.

*Example IV*

When trivinylborane is reacted with mercurous oxide employing a 5 percent excess of the trivinylborane in the presence of 20 moles of water per mole of the borane and 0.1 moles of potassium hydroxide per mole of the borane at room temperature, divinylmercury is obtained.

*Example V*

Employing the procedure of Example I, di-1-hexenylmercury is obtained in high yield when tri-1-hexenylborane is reacted with mercuric oxide at 50° C. for ½ hour.

*Example VI*

When 0.58 mole of tri-1-octadecenylborane are reacted with 0.25 mole of mercuric oxide in the presence of 10 moles of water and 0.012 mole of calcium hydroxide at a temperature of 100° C., di-1-octadecenylmercury is obtained.

*Example VII*

Employing the procedure of Example VI, when finely divided mercuric oxide is added to a solution of trioctadecylborane in water and containing a minor amount of sodium hydroxide while maintaining the reaction mixture at 80° C. during addition, dioctadecylmercury can be continuously withdrawn from the bottom of the reactor in high yield during the course of addition.

The above examples are presented by way of illustration and the invention is not intended to be limited thereby. It will be evident that other organoborane compounds described hereinbefore can be substituted to produce similar results.

As indicated, advantage is achieved by incorporating a base in the reaction mixture. The incorporation of such materials in the reaction mixture enhances the yields obtained and provides more efficient separation of the organomercury product. For this purpose the alkali and alkaline earth hydroxides are quite well suited as, for example, sodium hydroxide, potassium hydroxide, lithium hydroxide, magnesium hydroxide, calcium hydroxide, strontium hydroxide, and the like. The hydroxide need be added only in minor amount to result in a slight basicity of the reaction mixture. Generally, such materials are preferably added in amount between about 0.1 to 3.0 moles of hydroxide ion per mole of the mercury oxide.

The temperature at which the reaction is conducted is subject to considerable latitude, but generally is between about 0° C. to the decomposition temperature of the reactants or products. For practical reasons, the reaction is ordinarily conducted at between about 0 to 100° C. Best results are obtained, however, when the temperature is maintained between 20 to 100° C. There is no need to employ pressure in the operation unless one desires to conduct the reaction at a temperature above the boiling point of the reaction mixture. Reduced pressures can be employed if it is desired to steam distill the product from the reaction mixture as, for example, when it is lower boiling than the organoborane reactant.

The reaction is generally instantaneous so that time is not a critical factor. That is, the reaction is essentially complete upon completion of addition of the mercury oxide to the alkyl- or alkenylborane or vice versa. The time of addition can vary from between about 5 minutes to 2 hours or longer, although addition periods of about 30 minutes are usually quite adequate. Because of the instantaneous reactivity and the ready removal of the product from the reaction system, the process is readily adaptable for continuous operation. For example, one such operation would be the co-mingling of the mercuric oxide with a stream of the trialkyl- or trialkenylborane, water, and hydroxide, if employed, with continuous separation of the organomercury product from the system.

Having thus described the process of this invention, it is not intended that it be limited except as set forth in the following claims.

I claim:

1. A process for the manufacture of mercury products selected from the group consisting of alkyl- and alkenylmercury compounds which comprises reacting an organoborane selected from the group consisting of trialkyl- and trialkenylborane with an oxide of mercury in the presence of water.

2. A process for the preparation of diethylmercury which comprises reacting mercuric oxide with triethylborane at a temperature between about 20° C. to 100° C. in the presence of water and in the further presence of a minor amount of sodium hydroxide.

3. The process of claim 1 wherein said organoborane is a trialkylborane, said oxide of mercury is mercuric oxide, and said reaction is conducted at a temperature between about 20 to 100° C.

4. The process of claim 3 further characterized in that the reaction is conducted in the presence of a hydroxide selected from the group consisting of alkali and alkaline earth metal hydroxides.

No references cited.